May 19, 1936.  L. KIRSCHMANN  2,041,474
ADJUSTABLE AND CLAMPABLE STAND FOR ELECTRIC
LAMPS AND FOR DISPLAYING ARTICLES
Filed July 26, 1935   2 Sheets-Sheet 1
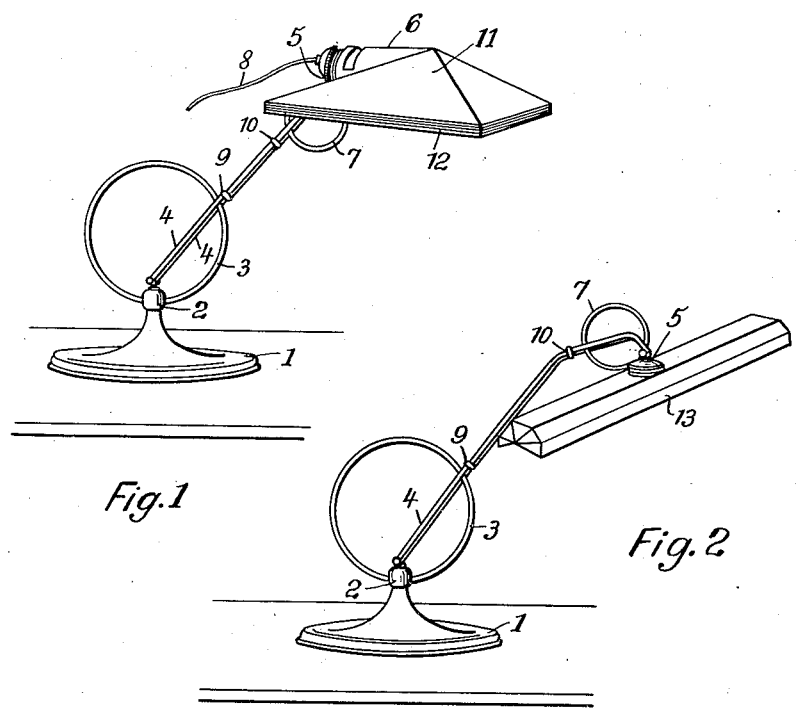
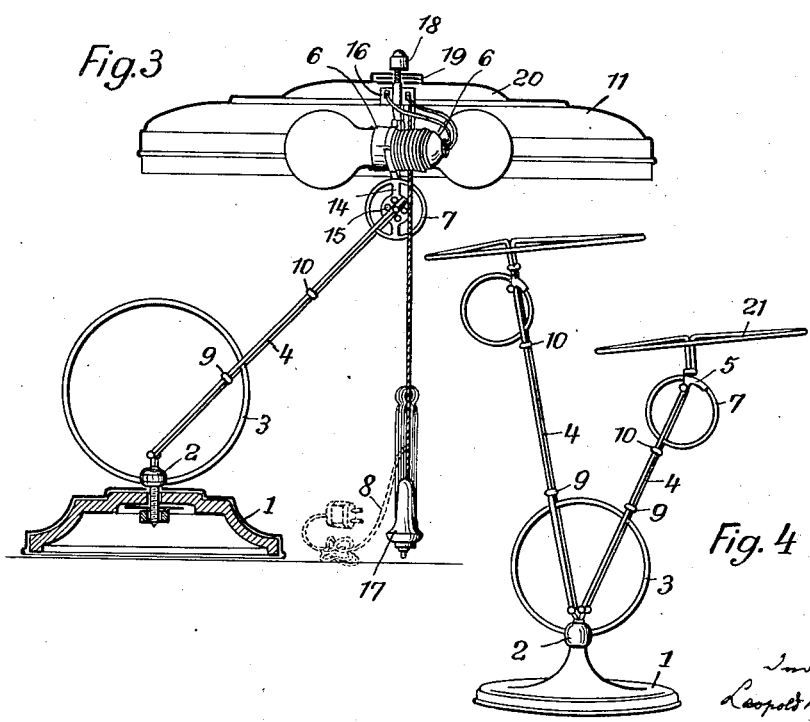

May 19, 1936.  L. KIRSCHMANN  2,041,474
ADJUSTABLE AND CLAMPABLE STAND FOR ELECTRIC
LAMPS AND FOR DISPLAYING ARTICLES
Filed July 26, 1935   2 Sheets-Sheet 2
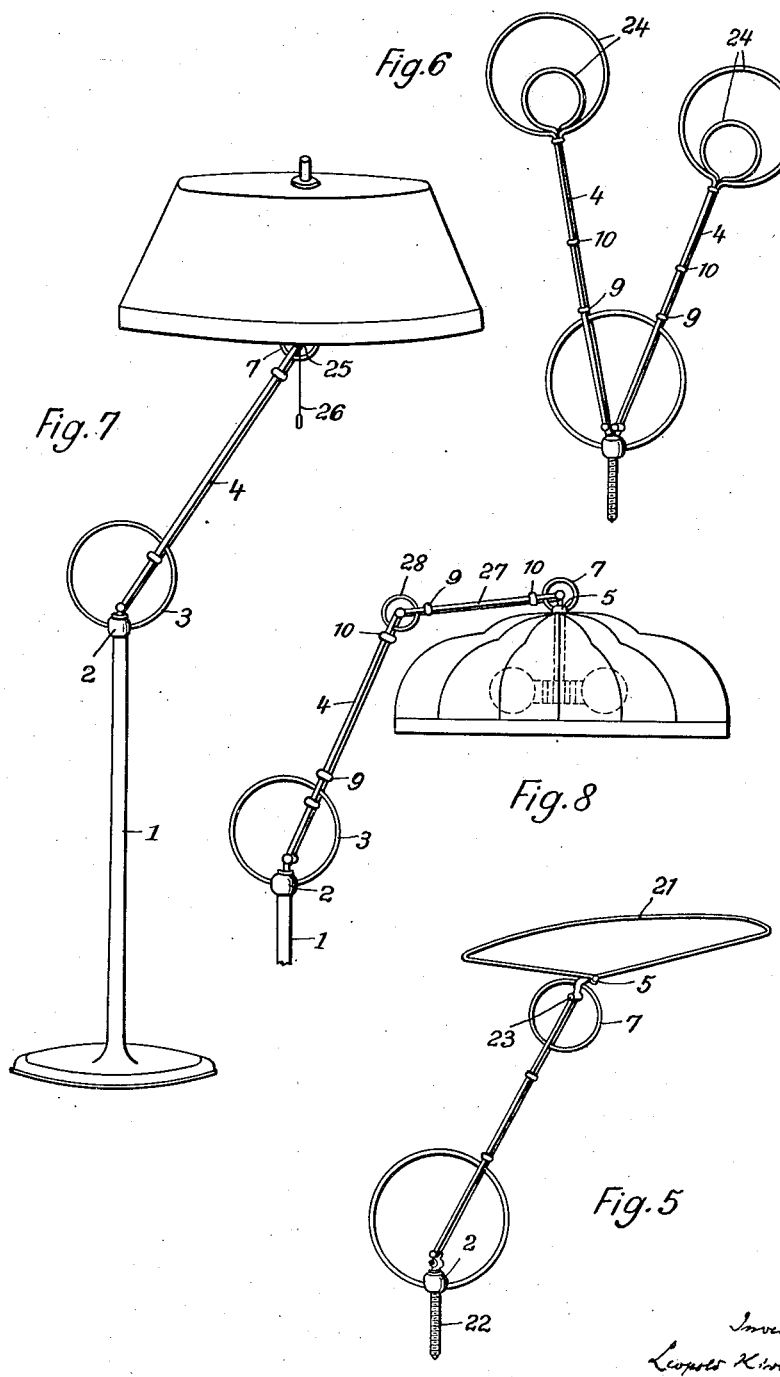

Patented May 19, 1936

2,041,474

UNITED STATES PATENT OFFICE 2,041,474

ADJUSTABLE AND CLAMPABLE STAND FOR ELECTRIC LAMPS AND FOR DISPLAYING ARTICLES

Leopold Kirschmann, Berlin-Halensee, Germany

Application July 26, 1935, Serial No. 33,318
In Germany March 20, 1935

9 Claims. (Cl. 248—160)

This invention relates to an adjustable stand for electric lamps and other articles. The adjustable stands or supporting arms of known construction, especially for electric lamps, possess the drawback that the ball and socket joints and screw bolts limit the movability and are liable to damage the electric leads. It has been proposed to employ braking and sliding devices as means for securing adjustable stands in the adjusted position, but they possess the drawback that locking screws are necessary which at the slightest vibration change the position, the thread of the screw or nut becoming worn when frequently used.

These objections are overcome by the adjustable stand according to the invention which is designed for holding electric lamps or other articles and consists of two parallel bars of any desired cross section hingedly fixed on a base and adapted to be clamped by means of a slide or slides on a fixed supporting element and adjusted as desired within 180° on this supporting element after the slide has been pushed away from this element.

If the adjustable stand is employed for electric lamps, it is no longer necessary to thread the electric leads through cones or tubes. It is also no longer necessary to re-cut cones or screw threads. The stand can be made from iron material by stamping, the several parts to be connected by rivets.

Several embodiments of the invention are illustrated by way of example in the accompanying drawings.

Fig. 1 shows in elevation an adjustable stand for an electric desk or writing lamp.

Fig. 2 shows in a similar view to Fig. 1 a modified stand for a soffit lamp.

Fig. 3 shows in elevation partly in section a third modification of the adjustable stand.

Figs. 4 to 8 show other modifications of the adjustable stand.

The adjustable and clampable stand shown in Fig. 1 comprises a foot 1 with knob 2. This knob has a curved bore in which a supporting element 3, in the form of construction shown a flat ring, is fixed. On the knob 2 two bars 4 are hingedly mounted which are of any desired suitable cross section and extend the one at the one side and the other at the other side of the fixed support or ring 3.

On the lamp holder 5 of the electric lamp 6 a support 7 in the form of a ring is fixed. The upper ends of the two bars 4 extend along the sides of this ring. The flexible cord 8 is introduced directly in the holder 5. On the portion of the adjustable stand formed by the two bars 4 between the two rings 3 and 7 two slides 9 and 10 are arranged, designed to clamp the bars on the corresponding supporting elements or rings 3 and 7. The lamp shade 11 may be of metal or other non-transparent material and it may have a narrow strip 12 of celluloid along its free edge to improve the efficiency of the illumination and the appearance of the lamp shade.

The adjustable lamp stand shown in Fig. 2 differs from that shown in Fig. 1 only in that the bars 4 are twice bent at the upper end so that the supporting element or ring 7 is situated above the holder 5 of the soffit 13.

The adjustable lamp stand shown in Fig. 3 has the low slide 9 on the bars 4 located inside the ring 3 and the upper ring 7 has a transverse bar 14 which at the middle is enlarged in disc-shape and has holes 15 for the bent off points of the bars 4. There are two lamps 6 on a twin holder 5 and the current is supplied through a distributor 16. The flexible cord 8 is interrupted by a press button switch 17. The connecting may, however, be by means of holders of other type. A screw bolt 18 extends upwards from the holder 5 and has a disc 19 which carries the lamp shade 11. This lamp shade is securely held by means of a screw cap 20. The lower slide 9 on the bars 4 is arranged inside the ring 3.

The adjustable stands shown in Figs. 4 to 8 are built according to the same principle as the stands shown in Figs. 1, 2 and 3.

Fig. 4 shows a double stand, the two bars 4 of each stand being hingedly mounted on the knob 2 of foot 1. The two bars 4 extend each along one side of the ring 3. The holder 5 with the upper ring 7 fixed on it is mounted on the frame 21 of the lamp shade. The slides 9 and 10 are on the portion of each stand extending between the rings 3 and 7.

As shown in Fig. 5 the knob 2 on which the two bars of the stand are hingedly fixed has a downwardly extending screw threaded pin 22 designed to be screwed into a foot. The upper ends of the bars 4 sit loosely on a transverse axle 23. The upper ring 7 and the holder 5 with frame 21 for the lamp shade are fixed on this transverse axle 23.

Fig. 6 shows two adjustable stands 4 in the upper end of which wire rings 24 are clamped designed to hold articles to be displayed, for instance fabrics.

The lamp stud shown in Fig. 7 has a foot with high post 1 on which the knob 2 for the ring 3 is fixed. The upper ring 7 is fixed on the upper axle 25 of the pull chain 26 of the electric lamp.

The adjustable stand 4 shown in Fig. 8 has hinged on its upper end an extension arm 27, composed of two parallel bars. A ring 28 is arranged between the two stands 4 and 27 and designed to guide the upper and lower ends respectively of these two stands. The extension stand 27 has also two slides 9 and 10 and is adapted to be clamped on the upper ring 7 fixed on the holder 7 of the electric lamp.

I claim:—

1. An adjustable stand with clamping device for electric lamps and other articles, comprising in combination a fixed knob, a flat guide element of suitable shape, such as a ring fixed on said knob, two parallel bars hingedly mounted on said knob and extending one at each side of said flat guide element, a second guide element to be fixed on the holder of an electric lamp, and two slides on said two parallel bars adapted to be shifted on said bars to clamp them on said guide elements.

2. An adjustable stand with clamping device as specified in claim 1, in which the slides are on the portion of the two parallel bars between said two fixed guide elements.

3. An adjustable stand with clamping device as specified in claim 1, in which the lower slide is on the portion of the lower parallel bar situated in the lower guide element.

4. An adjustable stand with clamping device as specified in claim 1, comprising in combination two parallel bars, the upper ends of which are each bent inwards, an upper fixed guide element in the shape of a ring, and a transverse bar in said guide element enlarged at the middle in disc-shape, this enlarged portion having holes for the inwardly bent ends of said bars.

5. An adjustable stand as specified in claim 1 for two electric lamps, comprising two pairs of parallel bars hingedly mounted on the knob, the bars of each pair extending on either side of the lower fixed guide element, two upper guide elements fixed one to each electric lamp and designed to hold the upper end of said two adjustable stands.

6. An adjustable stand as specified in claim 1, comprising in combination with the knob, a downwardly projecting screw threaded pin adapted to be screwed into a foot.

7. An adjustable stand as specified in claim 1, comprising two pairs of parallel arms, a lower flat guide element and two slides on each pair of parallel rods and wire rings adapted to be clamped in the upper end of each pair of arms by the upper of said slides.

8. An adjustable stand for high electric table lamps, comprising in combination with the foot, a high post, a knob fixed on said post, a ring fixed in said knob, two parallel bars hingedly fixed on said knob and extending each on one side of said ring, a slide on said bars inside said ring, a flat ring fixed on the axle of the switch of the electric lamp, and a second slide on said bars adapted to clamp the upper ends of said bars on said upper ring.

9. An adjustable stand as specified in claim 1, in which the lower slide on said bars is situated inside the lower guide element, a pair of extension bars hingedly mounted on the upper end of said lower pair of bars by means of a transverse axle, an intermediate guide element in the form of a flat ring fixed on said axle, an upper guide element in the form of a flat ring fixed on the axle of the lamp holder, and two slides on said extension bars adapted to clamp said bars on said intermediate ring and on said upper ring.

LEOPOLD KIRSCHMANN.